United States Patent [19]
Bantum

[11] Patent Number: 5,887,081
[45] Date of Patent: Mar. 23, 1999

[54] METHOD FOR FAST IMAGE IDENTIFICATION AND CATEGORIZATION OF MULTIMEDIA DATA

[75] Inventor: Michael G. Bantum, San Diego, Calif.

[73] Assignee: NCR Corporation, Dayton, Ohio

[21] Appl. No.: 568,900

[22] Filed: Dec. 7, 1995

[51] Int. Cl.$^6$ .................................................. G06K 9/78
[52] U.S. Cl. ........................ 382/173; 382/203; 382/256; 382/282
[58] Field of Search .................................... 382/199, 203, 382/256, 173, 176, 177, 175, 180, 179, 257, 204, 282, 283; 358/453, 462, 464; 345/434

[56] References Cited

U.S. PATENT DOCUMENTS

| | | | |
|---|---|---|---|
| 4,783,829 | 11/1988 | Miyakawa et al. | 382/199 |
| 4,972,495 | 11/1990 | Blike et al. | 382/304 |
| 5,073,958 | 12/1991 | Imme | 382/267 |
| 5,091,967 | 2/1992 | Ohsawa | 382/172 |
| 5,115,477 | 5/1992 | Groezinger | 382/199 |
| 5,119,439 | 6/1992 | Osawa et al. | 382/199 |
| 5,119,440 | 6/1992 | Duenyas et al. | 382/199 |
| 5,181,261 | 1/1993 | Nagao | 382/266 |
| 5,301,264 | 4/1994 | Hori et al. | 345/428 |
| 5,369,714 | 11/1994 | Withgott et al. | 382/173 |
| 5,369,742 | 11/1994 | Kurosu et al. | 395/147 |
| 5,719,951 | 2/1998 | Shackleton et al. | 382/118 |

OTHER PUBLICATIONS

Brinkhoff, T.; Kriegel, H.–P. and Schneider, R., "Comparison of approximations of complex objects used for approximation–based query processing in spatial database systems", Proceedings. Ninth International Conf. on Data Engineering, IEEE Compt. Soc. Pres, Apr. 1993.

Menet et al. "Active Contour Models: Overview, Implementation and Applications." Systems, Man and Cybernetics, 1990, IEEE International Conference on, 1990.

Caselles et al. "Geodesic Active Contours." Proceedings, 5$^{th}$ International Conference on Computer Vision, pp. 694–699, Jun. 1995.

Chen et al. "A Parallel Method for Finding the Convex Hull of Discs." ICAPP 95, pp. 274–281, Apr. 1995.

*Primary Examiner*—Jon Chang
*Attorney, Agent, or Firm*—James M. Stover

[57] ABSTRACT

A method for combining multiple digital shape objects contained within a digitized document to obtain a distinct shape or hull dependent on the shapes of the original objects. This shape may thereafter be utilized to simplify storage, recognition, and classification of the digitized documents. The method for combining multiple digital images includes the steps of forming a connected, one-pixel thick boundary around the shape objects contained within a document; and collapsing the boundary around the contained digital objects, the boundary thereby attaining a distinct shape or hull dependent upon the shapes of the digital objects contained within the document. When necessary, pixels are deleted from the boundary to "shrink-wrap" or make taut the boundary around the contained objects.

6 Claims, 7 Drawing Sheets

METHOD FOR FAST IMAGE IDENTIFICATION AND CATEGORIZATION OF MULTIMEDIA DATA

The present invention relates to digital image processing and more particularly, to a method combining multiple image shapes for simplifying storage, recognition, classification and retrieval of digital image information stored within a multimedia database.

BACKGROUND OF THE INVENTION

Recent increases in computer processor speed and performance, increases in the capacity and performance of volatile and non-volatile storage devices, and improvements in the overall performance and affordability of computer systems and network solutions now give many users the ability to process and store non-traditional, non-alphanumeric, data types such as multimedia objects, pictures and images, complex documents, video and audio data.

Many businesses are beginning to incorporate image and other non-traditional data objects into their mission critical data, and database technology is evolving to accommodate these complex data types. These complex data types may include bank checks and documents, business correspondence, employment records including employee pictures, medical information which may include diagnostic images such as X-rays, pictures and blueprints of buildings and facilities, video presentations, and other graphics or pictures related to a company's business.

Unique challenges are presented in the processing, classification, storage and retrieval of these non-traditional data objects. Currently images can be transmitted on networks and saved into computer databases, but there is no image content based methodology to recognize or sort through images. There exists a need to develop and improve methods for recognizing and sorting image data and linking images with other types of data, including text, sound and video.

OBJECTS OF THE INVENTION

It is therefore an object of the present invention to provide a new and useful method for simplifying storage, recognition, classification and retrieval of digital images.

It is another object of the present invention to provide a new and useful method for combining multiple image shapes to identify or classify digital image data.

It is yet another object of the present invention to provide such a method for combining multiple image shapes to identify or classify digital image data in which such images are identified by a contour formed about the multiple images.

It is still a further object of the present invention to provide a new and useful method for retrieving complex data, such as bank notes or business correspondence, from a database by identifying unique image data contained within the complex data.

It is yet another object of the present invention to provide such a method for retrieving complex data, such as bank notes or business correspondence, from a database by identifying multiple image shapes contained within the complex data.

It is yet another object of the present invention to provide all of the above, in a fast and efficient algorithm using the parallel processing capabilities of multiprocessor computers.

SUMMARY OF THE INVENTION

There is provided, in accordance with the present invention, a method for combining multiple objects contained within a digitized document to obtain a single, identifiable hull (shape or footprint that contains or "wraps" the original objects). This hull may thereafter be utilized to simplify storage, recognition, and classification of digitized documents. The method comprising the steps of forming a pixel boundary around the object contained within a document; and collapsing the boundary around the contained objects, the boundary thereby attaining an identifiable, easily analyzed hull dependent upon the shapes of the objects contained and isolated within the original image.

In the described embodiment, a digitized document including objects such as digital images comprises an array of pixels, each pixel having an intensity value associated therewith. The boundary is formed of a plurality of eight-connected pixels and has a thickness of one pixel. Each boundary pixel's two neighbor pixels in the boundary are linked such that those neighbors can be distinguished from other eight-connected neighbors not forming part of the boundary. If the bounding box of the objects to be hulled is known, it is taken to be the initial pixel boundary; if not, an arbitrary boundary containing the objects to be hulled can used for the method (e.g., an arbitrary boundary drawn with a mouse or pen device).

The step of collapsing the boundary around the contained objects comprises the steps of: determining the inside direction for each boundary pixel, examining each pixel contained within the boundary, sequentially or in parallel; determining which pixels can be deleted from the boundary; deleting eligible pixels; reforming the boundary list; determining which pixels in the boundary can be moved in the "inside" direction defined for that pixel; and "moving" each eligible boundary pixel one coordinate in the "inside" direction, "closer" to the "center" of the image region that the current pixel boundary surrounds and that contains the objects to be hulled The boundary is processed repeatedly in rounds, each pixel in sequence or all in parallel, until the coordinates of each pixel within the boundary becomes fixed.

The above and other objects, features, and advantages of the present invention will become apparent from the following description and the attached drawings.

DETAILED DESCRIPTION OF THE PREFERRED EMBODIMENT

Figure 1:
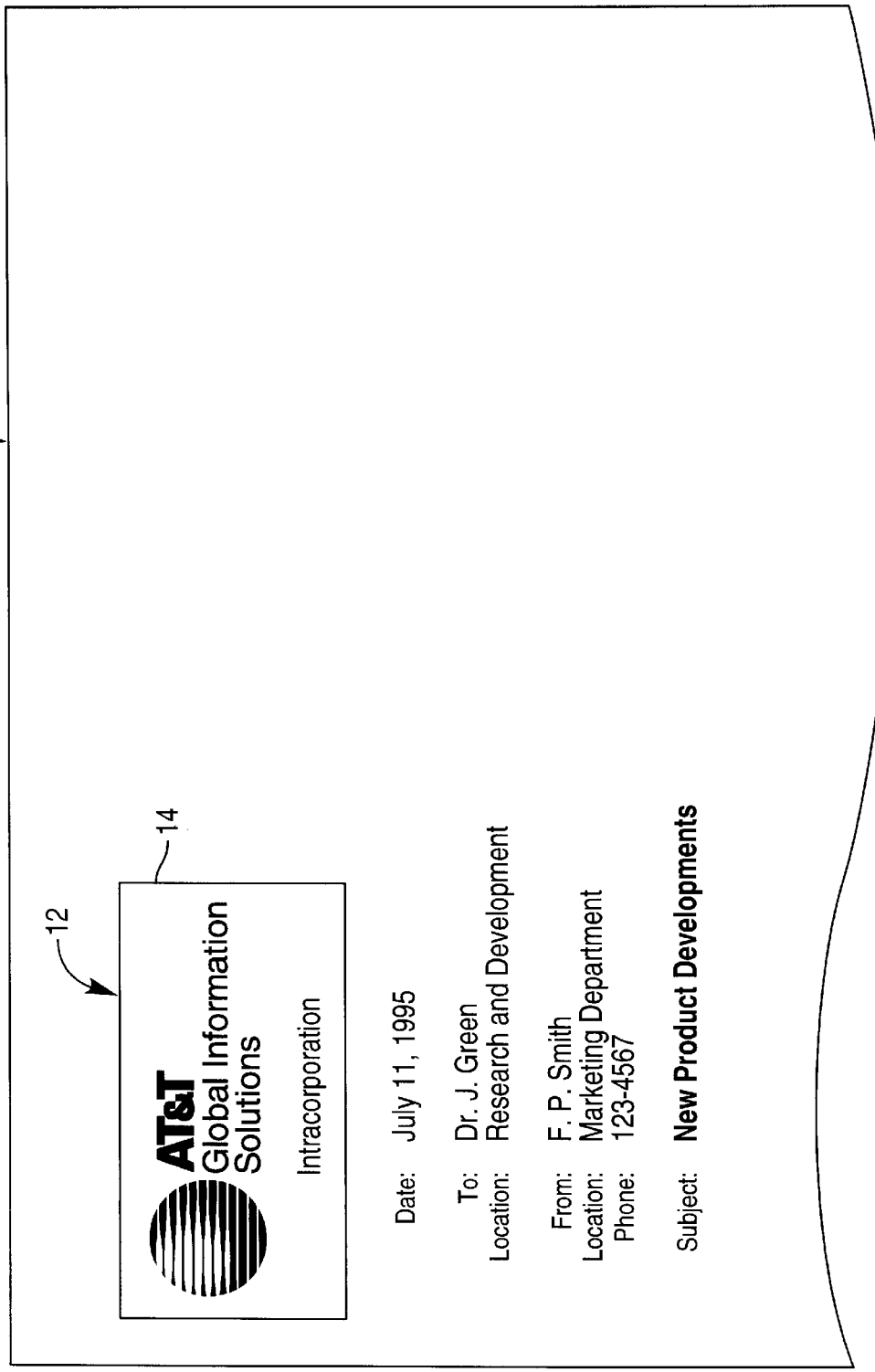
FIG. 1 is an illustration of the top portion of an intracorporation memo including image data.

Referring now to FIG. 1, there is seen the top portion of an intracorporation memo 10 including an object, i.e., image data representing, a company logo 12. The memo 10 including logo 12 is saved in digital form within a computer database together with other internal correspondence and correspondence from external sources which has been digitized. This correspondence from external sources may also contain image data representing other company logos, graphics, or pictures.

A digital image is an image which has been resolved into an array of picture elements, referred to as pixels, the pixels being arranged in rows and columns within the array. Thus, each boundary and object pixel's location is fixed by a system of Cartesian coordinate vectors - x and y in the two dimensional case. Additionally each pixel's state information (which includes links to its two boundary neighbors, its initial sequence label, its current segment membership, and its current direction) can be quickly referenced at that same coordinate vector. For black and white images, each pixel within the image has associated therewith a brightness or intensity value which identifies the gray level at that location within the image. A typical digital image may include pixels having gray level intensity values ranging from 0, representing black, to 255, representing white.

A rectangular box, i.e., black pixel boundary 14, enclosing the image data to be processed has been established through known preprocessing procedures. More specifically, image objects 12 have been isolated and a connected, black pixel boundary completely encloses the objects to be processed or "hulled". The pre-processing also renders the region to be hulled as a bi-level image, i.e., black outlined shapes on a white background. Methods for converting the image to a bi-level image which are well known in the art include intensity histogram analysis or edge detection based on gradient analysis. This pre-processing enables shape and object pixel detection.

With the exception of pixels located at the edge of the image array, each pixel p within the image array has four horizontal and vertical neighboring pixels as well as four diagonal neighbors. The eight pixels adjacent to pixel p are known as the eight-neighbors of p. Two pixels are said to be eight-connected if they are eight-neighbors and their intensity values satisfy a specified criterion of similarity, e.g., the intensity values for the neighboring pixels are equal. The pixel and its neighbors form a 9 pixel square subregion or "window" organized as a 3×3 pixel matrix. The concept can be generalized to k×k pixel subregions. Neighboring pixels occupying the four horizontal and vertical positions at the window's edge are known as four-neighbors of p.

A set of 3×3 window structures, preset pixel intensity values are used to "match" and verify boundary pixel orientations for purposes of this method (i.e., deciding whether a pixel can be deleted or moved). These are called pixel masks. There are 28 such orientations possible for 3×3 masks. Since this method assumes that the input image has been rendered bi-level by pre-processing (i.e., each pixel's intensity is represented by 0 or 1), mask to image comparison operations may be quickly accomplished by bitwise raster operations. Individual mask cell values are compared to the corresponding overlapped pixel location's intensity value in each position of the 3×3 mask to determine if there is a match.

A bounding box or rectangle is also maintained as the method executes. It is determined by the minimum and maximum x and y coordinates of the current boundary or set of objects. The minimum(x, y) coordinate vector and the maximum(x, y) coordinate vectors define opposite corners of the bounding rectangle. The two coordinates thus determine the minimal rectangle containing the boundary or objects in question.

Two pixels, p and q, are adjacent, if the magnitude of the difference between their coordinate vector components is at most one (i.e., $|x_q-x_p| \leq 1, |y_q-y_p| \leq 1$). Note that the method disallows "overlapped" pixels.

Figure 2:
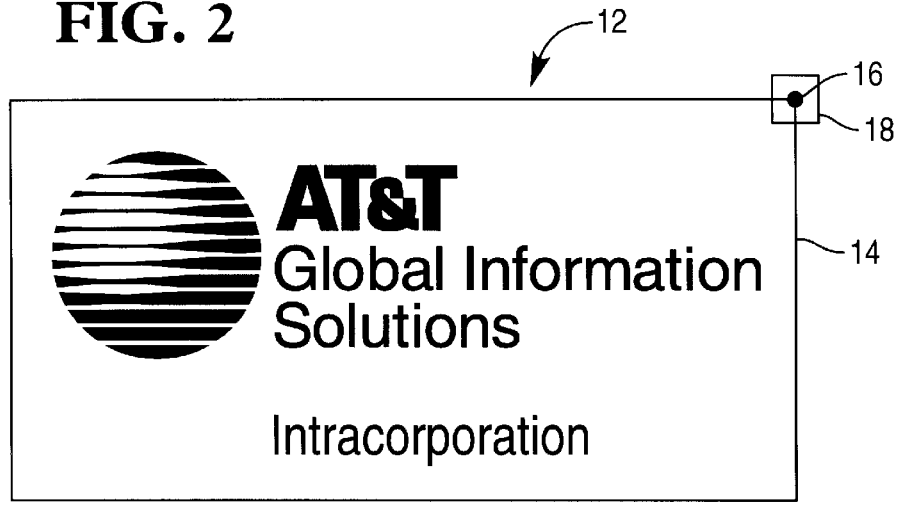
FIG. 2 shows the image data, i.e., a company logo and accompanying text, shown in FIG. 1.

FIGS. 1 and 2 represent "before" illustrations of image 12, prior to the application of the techniques described below to the pixels forming pixel boundary 14 to determine a single shape for the contained image and text data. The result of the hulling process is simulated in the "after" illustration of FIG. 3.

PIXEL AND BOUNDARY PROCESSING

FIG. 5SA illustrates the initialization and inputs required for the hulling algorithm. The initial boundary is depicted inscribed in a bounding rectangle 41. From the bounding rectangle, two diagonals 43 and 45 are computed which determine the current "center" 47 of the boundary, which contains the objects 51, 52 and 53 to be hulled. Half the major axis 60 of the current bounding rectangle is defined as the current radius R of the boundary. The current bounding rectangle and thus R are updated at the end of each processing cycle as described below. The position and coordinates of each object and boundary pixel are determined in relationship to an origin coordinate (0,0) and the x and y axes shown. These coordinates also provide array indices for the storage and retrieval of state information for each pixel, including links to boundary neighbors, the pixel's initial sequence label, its current segment membership, and its current movement direction.

The diagonals 43 and 45 of the bounding rectangle determine four quadrants A, B, C and D and the current "center" of the boundary. The quadrants are updated with the bounding rectangle at the end of each processing round. Pixels in the quadrant labeled A in FIG. 5A must move to the "right" towards the "center" of the boundary; pixels in B must move "down"; pixels in C must move to the "left"; and pixels in quadrant D must move "up".

Processing enters a loop of processor execution rounds which consist of locking and deletion steps followed by pixel movement. The conditions for pixel movement are as follows: (1) the boundary pixel does not contact, "adhere" to, or form part of the objects to be hulled, (2) there is no other boundary pixel occupying the coordinates to where the move's direction will take the pixel, (3) the planned move will not disconnect the pixel from either or both of its boundary neighbors, and (4) the section of the boundary containing the boundary pixel does not exceed or violate a predetermined boundary "tautness" condition. When no pixel in the boundary changes state, the first stage of the algorithm terminates. This is referred to as the "first hull" stage.

If a boundary pixel determines that its two boundary neighbors are adjacent via application of a suitable mask, it attempts to lock itself and its two neighbors. If it fails to get all of the locks its processor idles until the movement phase. If it gets all three locks, it deletes itself from the current pixel boundary and places its resources back on the free list (e.g., its current processor, memory, etc.).

Pixel "movement" proceeds by incrementing or decrementing the y coordinate value of the pixel's location vector, depending on whether it currently occupies quadrant B or D, respectively. Horizontal movement is computed analogously. If a pixel crosses into a different quadrant in the course of processing, its direction is changed accordingly. A pixel is moved by copying it to its new image coordinate and erasing it from its old coordinate. In the parallel case, exclusive locks on the boundary pixel's current and future location coordinates must be acquired before the move, or the move is disallowed in this round.

A normalized first hull boundary consists of unadhered pixels formed in at most two straight line segments and adhered pixels forming arbitrary curves (single pixel "line" segments) in contact with the hulled objects. A first hull is normal, if its initial pixel boundary was drawn outside the bounding box of the hulled objects. If the initial boundary is very irregular, the possibility of a continuous sequence of unadhered boundary pixel segments consisting of three or more line segments exists. In this case, further processing is initiated to normalize these unadhered segments. The extra, internal segments are deleted, and the one or two external segments (those adhering on at least one end point to a hulled object) are extended until they intersect to form the normalized boundary.

At this point, the hull can be made less "taut" by allowing movement of a predefined number of boundary pixels at each end of horizontal or vertically oriented, as yet unadhered boundary segments. The number of these moves to allow can be determined in any number of ways (e.g., a fixed number could be chosen). A method based on circle arc-chord length difference is provided. A hull of this character is termed a second hull.

Finally, the hull can be completely "relaxed" or made un-taut by letting horizontal and vertically oriented, unadhered boundary segments, continue movement until they collapse into two diagonally oriented and spaced segments. While continuing to move, some of the pixels may adhere to a hull object or another boundary segment, resulting in the creation of additional segments. A hull of this character is termed a third or relaxed hull.

Figure 5A:
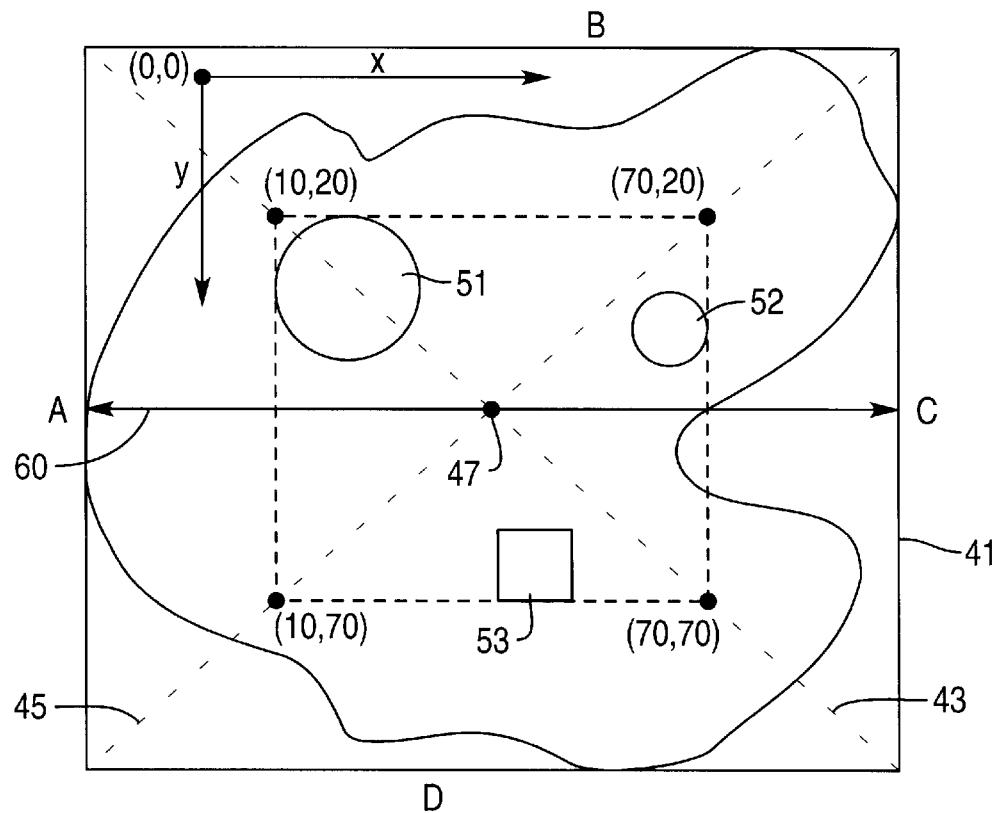
FIGS. 5A through 5F illustrate the stages of the hulling process in accordance with the present invention.

The above described process stages are illustrated in FIGS. 5A through 5F. FIG. 5A, as described above, represents initialization of the method and shows three objects labeled 51, 52 and 53 to be hulled. It also shows an initial boundary inscribed in a bounding rectangle of major dimension 2R. A bounding box 41 for the objects is also shown and can be used as an initial boundary, if known beforehand. A coordinate system in x and y in standard position with an origin at (0,0) is shown. Directional diagonals 43 and 45 are shown which partition the boundary pixels into four sets, identified by reference characters A, B, C and D, for purposes of determining pixel movement direction.

Figure 5B:
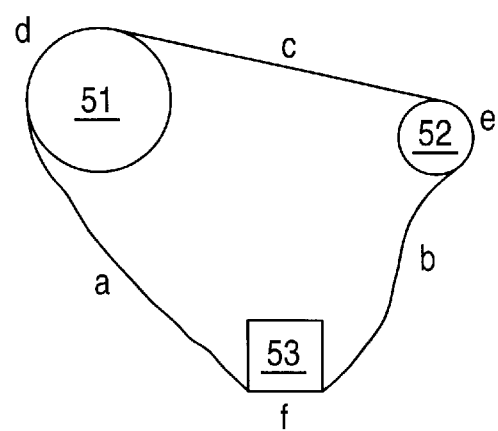

FIG. 5B illustrates an intermediate processing stage and shows the hull boundary adhered to the objects, resulting in the division of boundary into six segments, identified by lower case reference characters a through f.

Figure 5C:
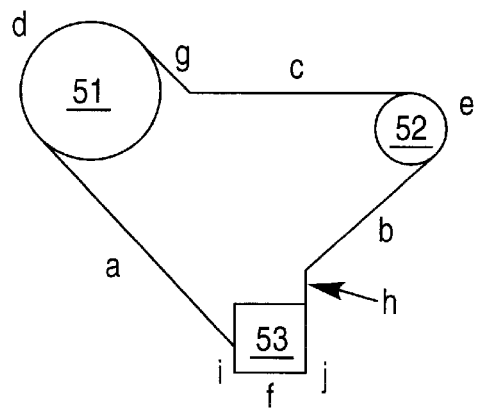

FIG. 5C illustrates the normalized "first hull" termination stage of the hulling process. There are three sets of unadhered segments divided into one or two straight line boundary segments a, b, c, g, h. The segments are initially taught (i.e., each boundary pixel in the unadhered segments is oriented in a straight line).

Figure 5D:
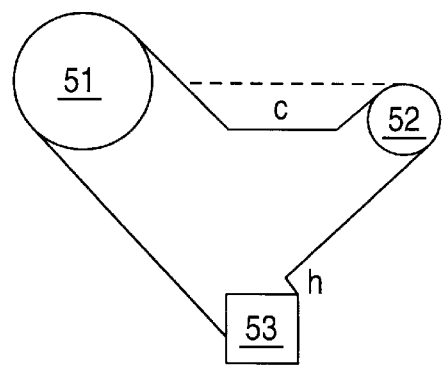

FIG. 5D represents the movement of pixels at the ends of unadhered boundary segments to achieve partial relaxation of tautness and more hull shape differentiation.

Figure 5E:
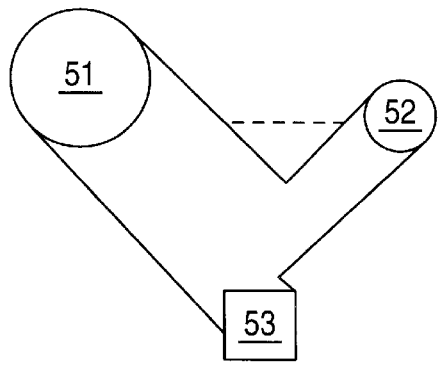

FIG. 5E shows a fully relaxed hull boundary superimposed over the original objects 51, 52 and 53.

Figure 5F:
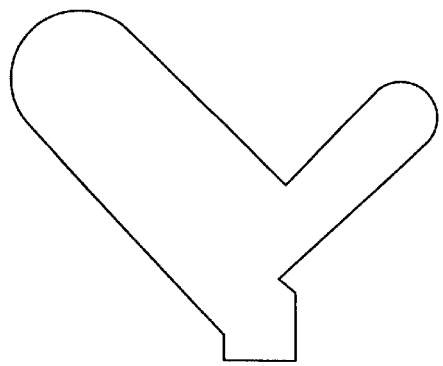

FIG. 5F shows a fully relaxed third hull, independent of the original objects. Any one of the hulls illustrated in FIG. 5D, 5E or 5F can undergo shape matching or analysis for purposes of image content analysis applications.

Figure 7A:
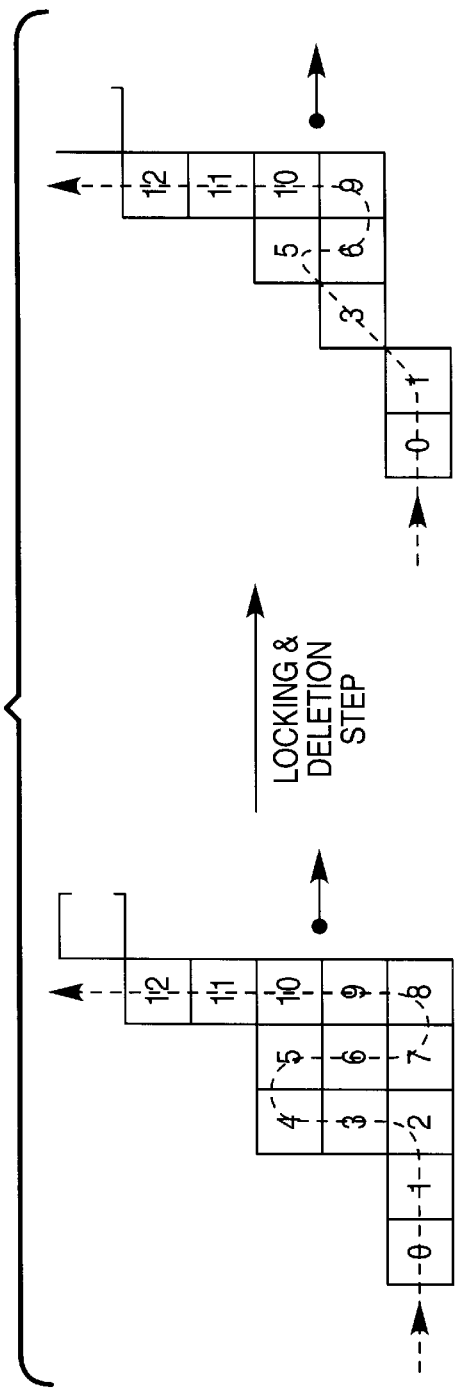
FIGS. 7A through 7C illustrate local boundary processing in accordance with the hulling process.
Figure 7B:
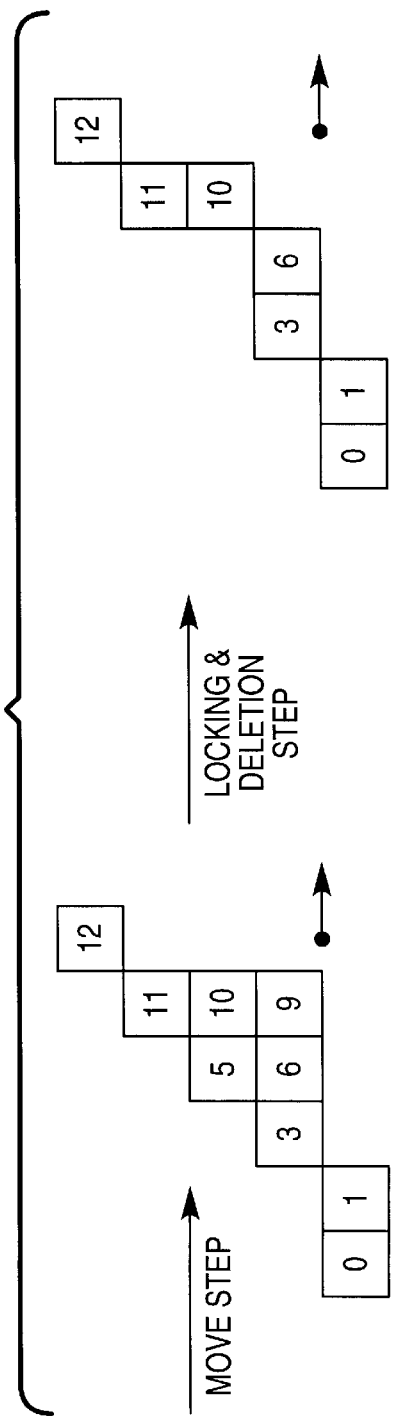
Figure 7C:
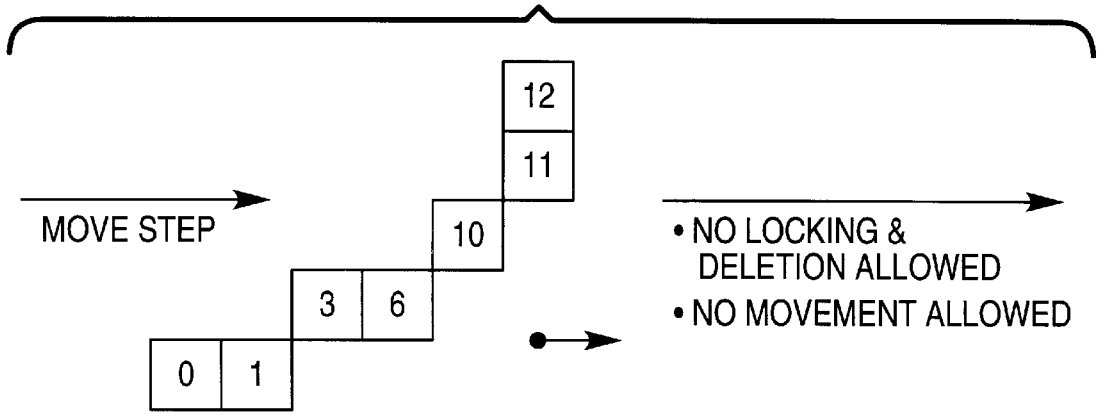

Boundary pixel deletion and movement within a round are illustrated by FIGS. 7A through 7C. FIGS. 7A through 7C illustrate local boundary processing. In the multi-processor case, twelve processors can be allocated to each of the sequence labeled boundary pixels. A deletion candidate and its two neighbors are locked in the parallel case to prevent collisions. A sequence of rounds alternating deletion and movement steps are applied until no further deletions or moves are possible. In general, a pixel is deleted when its two neighbors are adjacent. A pixel is moved when it will not disconnect from its two neighbors or collide with another boundary segment or object pixel.

Figure 6A:
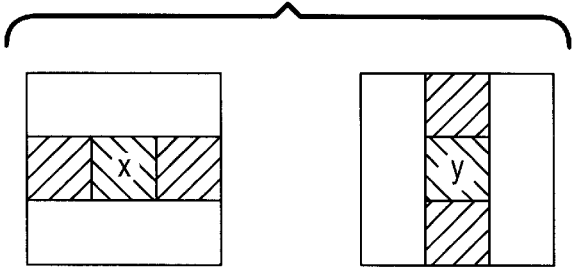
FIGS. 6A through 6C illustrates hulling process conditions for boundary pixel movement inhibition.
Figure 6B:
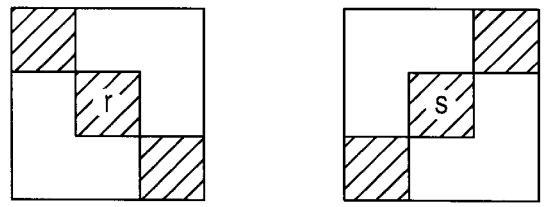
Figure 6C:
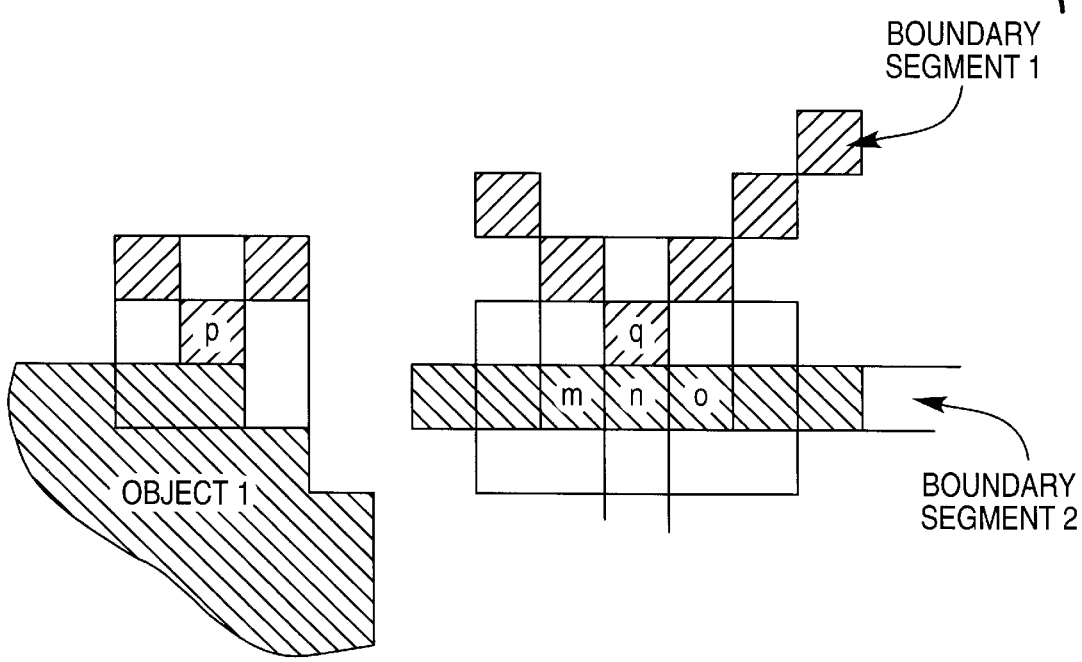

Pixels are idled when they achieve a boundary "tautness" or fixation condition. Fixation conditions are specified in FIGS. 6A through 6C. When a boundary pixel and its two boundary neighbors reach one of the straight line configurations illustrated in either of FIGS. 6A or 6B or adheres to another segment's boundary pixel or one of the hulled objects as shown in FIG. 6C, it can move no further unless later or parallel changes alter the present orientation.

In the single-processor case, boundary 14 is processed, in accordance with the method of the present invention, pixel by pixel in a clockwise fashion, "shrinking" and "moving" the boundary until it "wraps" the included objects to be hulled. Sequential processing begins by choosing an arbitrary boundary pixel, say pixel 16, as shown in FIG. 2, and proceeds sequentially clockwise, as shown by arrow 18, until all the boundary pixels have been examined. A processing circuit or round refers herein to a single, sequential or parallel, examination of all the pixels comprising boundary 14. A processing circuit is completed, and a new circuit begins with pixel 16 or its surviving, clockwise, successor, if it and the intervening pixels have been deleted from the boundary.

Each pixel p located on boundary 14 can be masked as described above for comparison purposes. For each boundary pixel, two of its eight-neighbor pixels reside on boundary 14.

Figure 3:
FIG. 3 is an illustration of the image data following multiple object hulling in accordance with the present invention.
Figure 4:
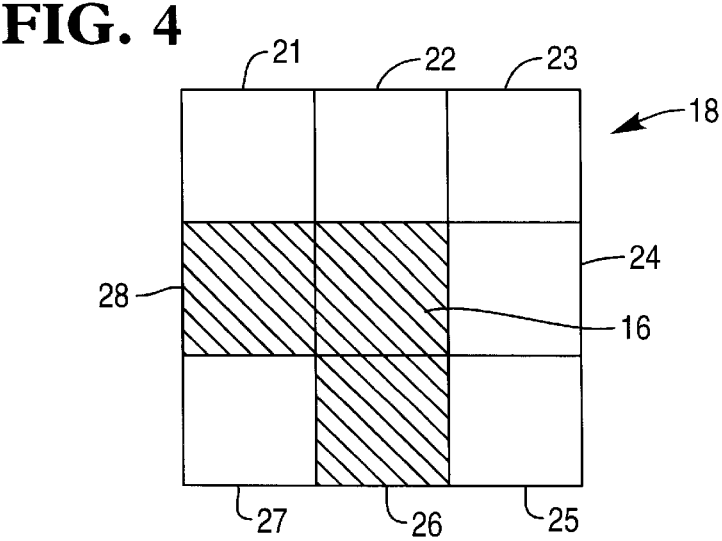
FIG. 4 shows a 3×3 image subregion containing a boundary pixel (pixel 16), and its two boundary neighbors (pixels 28 and 26).

FIG. 4 illustrates pixel 16 from FIG. 3 and the three-by-three pixel mask region 18 associated with pixel 16. Pixels 22, 24, 26 and 28 are the four- neighbors of pixel 16, while all of pixels 21 through 28 represent the eight- neighbors of pixel 16. Pixels 16, 26 and 28, shown darkened, are eight-connected neighbors forming a portion of border 14. There are 28 possible boundary orientations given a three by three mask.

Each mask and the current direction, determines if a boundary pixel may move. Boundary pixels are either deleted, don't move or move to the "inside" of the bounded region. Direction is maintained while the pixel remains in a directional quadrant. There are four possible directions with respect to the image: up, down, right, and left. The directions are generally perpendicular to the "slope" of the boundary as formed within a three by three mask region. Processing on the current pixel proceeds in the following order:

1. first, pixel deletions are processed;
2. pixel state is updated (e.g., the pixel's neighbors are linked directly);
3. checks against state restrictions are completed;
4. lastly, the pixel is moved (if allowed given its current state).

Processing then continues with the next clockwise neighbor. All processing and state information is kept local to the current pixel being processed. This allows both parallel and single processor implementations of the hulling process.

The following invariants must be maintained during boundary pixel processing to provide boundary and processing integrity:

1. the boundary stays one pixel thick,
2. the boundary stays eight-connected, and
3. pixel movement can never cause disconnection from a neighbor pixel or collision with another boundary or object pixel.

Prior to processing, boundary 14 is seen to comprise a rectangular box enclosing image and text 16. As a rectangle, the boundary thus consists of four segments. As boundary pixels are moved through the process described herein, these four segments will necessarily be divided into additional segments. In fact, any continuous open or closed curve represented as a digital image is actually an approximation of a continuous curve formed from many segments as all points on the digitized image of the curve are discrete elements within a rectangular array.

When a boundary touches the image object, or multiple image objects, contained within the boundary in two places, the intervening pixels are marked as a new segment and become subject to boundary segment rules. The boundary segment must delete, i.e., shrink, boundary pixels until "tautness" is satisfied, or the boundary segment touches another object and is again divided into additional segments. A boundary pixel's current segment membership is maintained as state information for the pixel. When first stage termination is achieved (see FIG. 5C), unadhered segments have achieved straight line orientations. These sub-segments are identified, and segment normalization is applied, if necessary. Normalization proceeds by deletion of internal segments (segments that touch no object at either endpoint), and extension of the remaining external segments until they again intersect.

BOUNDARY TAUTNESS

Initial boundary tautness is achieved at "first hull" stage termination as illustrated in FIG. 5C. FIGS. 6A and 6B show the mask orientations which determine or fix this boundary tautness as a by-product of the method's per-round processing.

When more hull differentiation is desired, processing can be allowed to continue for a fixed number of rounds, n, with the vertical and horizontal mask orientations required in FIG. 6A, part (a), not in force. This will result in a "second hull" as illustrated in FIG. 5D.

One of any number of ways to determine n can be based on tautness defined as the length of circle arc formed on its straight line chord. The circle radius used to compute arc length is defined as some constant multiplied by the major axis of the final bounding box (i.e., R as depicted in FIG. 5A). A segment of one pixel is defined to have an arc of one pixel, for convenience.

The following formula can be used to quickly compute n, or the number of additional processing rounds, for "arc-chord" tautness based on R and the individual boundary segment length, S, for all R, S and n such that $n \geq 1$, $R \geq \frac{1}{2}S$.

$$n = \left( R \sin^{-1}\left( \frac{S}{2R} \right) \right) - \frac{S}{2}$$

Here, n is taken to estimate the difference in pixels between the "circle" arc length that circumscribes the "chord" whose length is taken from the boundary segment length, S. The chord and arc lengths are halved since a move will add length to both sides of a boundary segment. The arcsin function is used to determine the radian arc length. If n is not an integer we take its floor function to round it down to the nearest integer.

Given a positive value for n, the algorithm is allowed to process the "first hull" for n additional rounds to achieve a "second hull". A "third or lax hull" is generated by allowing additional rounds until no further boundary changes are possible (see FIG. 5E).

When one complete circuit or round of the current boundary has been completed with no changes, a list of boundary points collected into segments is returned as the final "shrink-wrapped" hull result.

Alternatively, if the number of pixels in the boundary reaches three total, the region is recognized as empty and the algorithm terminates with a failure condition.

The complexity of this process is dependent on the number of processing circuits or rounds of boundary processing. Since the size of the boundary decreases mostly as a function of its current size, the process has efficiencies to recommend it. And since the method allows parallel processing of each boundary pixel within a round, multi-processor technology further speeds the process. The hulling process' structure should lend it to a very fast parallel processor implementation, where each boundary pixel is assigned an individual processor. The described hulling process functions to abstract and simplify complex shapes or groups of shapes quickly, while preserving identifying characteristics.

HULL MATCHING

The result, a hull boundary, can be quickly processed for shape matching.

A simple matching algorithm, known in the art, executes a circuit of the hull, computing each segment's direction change and length (as a proportion of hull length). The sequence of segment changes can then be compared to those of another hull. The same or similar changes can be interpreted as a match.

Generally, the resulting hull is normalized in some respect and then compared with a template hull for degree of similarity. Routines suited to comparing hull shapes are well known in the art. For example, shape numbers could be computed and compared for shape "distance". Or a Fast Fourier Transform can be applied to boundary point coordinates in complex form, producing a set of Fourier descriptors which can be compared on a number of properties. Statistical, threshold or other criteria would decide if there is a match.

The process of finding the set of objects within an image to hull is a different problem which is not addressed by this invention.

POSSIBLE APPLICATIONS

The hulling process described herein converts a group of shapes, occurring in the same formation into a single shape which nevertheless preserves enough information about the original shapes to be matched against the same objects in any stored image, perhaps subject to restrictions on shape orientation.

The hulling process eases and speeds content analysis of digital data stored in databases. It could be an important part of any library of content analysis functions. Such a library may be packaged as part of multimedia database server product. For example, the hulling process could be used to generate shape matching templates for identification or classification of database stored, non-alphanumeric data, i.e., digitized representations of sound, pictures, documents, etc.

This hulling process provides low level, heuristic support for database applications (tools) requiring fast image identification and categorization.

Image searching and sorting applications could be based on the hulling process. Such applications would automatically identify image subsets containing user selected or defined shapes by matching objects within images. For example, this could allow automatic extraction of documents based on a corporate logo, proper name, or title appearing within the document.

CONCLUSION

It can thus be seen that there has been provided by the present invention a new and useful method for combining multiple image shapes to identify or classify digital image data. The described method determines a single shape also referred to as a contour or hull) for multiple objects. The process for combining multiple shape objects can be utilized for retrieving complex data, such as bank notes or business correspondence, from a database by identifying multiple image shapes contained within the complex data.

Although the presently preferred embodiment of the invention has been described, it will be understood that various changes may be made within the scope of the appended claims. For example, in the hulling process as described above, the direction for sequential border pixel processing was arbitrarily chosen as clockwise although a counterclockwise direction could be utilized. The number of processing circuits and degree of tautness could be varied to improve accuracy or reduce processing time. Additionally, in the discussion set forth above, all images were assumed to be gray scale images using 0 to 255 positive, integral intensity levels; however, the concepts and methods described may equally as well be applied to color images.

What is claimed is:

1. A method for combining multiple digital objects contained within a digitized image, wherein said digitized image including said digital objects comprises an array of pixels, each pixel having an intensity value associated therewith; the method comprising the steps of:

forming a boundary around said digital objects, said boundary being formed of a plurality of eight-connected pixels;

collapsing said boundary around said contained digital objects, said boundary attaining a distinctive hull having a shape dependent upon said contained digital objects, said step of collapsing said boundary including the steps of:

examining each pixel in said boundary, and moving each examined boundary pixel one pixel location closer to said contained digital objects, said movement being permitted only when:

said examined boundary pixel does not overlap pixels included within said contained digital objects;

said examined boundary pixel does not collide with another boundary pixel location; and a section of said boundary containing said examined boundary pixel does not violate a predetermined tautness condition; and repeating said step of examining each pixel contained within said boundary until the location of each pixel within said boundary becomes fixed.

2. The method in accordance with claim 1, further including the step of:

converting said contained digital objects into to bi-level images prior to said step of collapsing said boundary around said contained objects, said bi-level images comprising pixels having one of two intensity values.

3. The method in accordance with claim 1, wherein said step of collapsing said boundary around said contained objects includes the step of:

deleting said examined pixel from said boundary when the two pixels contained within said boundary which neighbor said examined pixel are adjacent to each other.

4. The method in accordance with claim 3, wherein said boundary has a thickness of one pixel.

5. A method for simplifying storage, recognition classification and retrieval of a digitized document containing multiple digital objects, said digitized document and said digital objects comprising an array of pixels each pixel having an intensity value associated therewith, the method comprising the steps of:

identifying the location of said multiple digital objects:

forming a single boundary around said multiple digital objects;

collapsing said boundary around said contained digital objects, said boundary attaining a distinct hull having a shape dependent upon said contained digital objects wherein said boundary is formed of a plurality of eight-connected pixels; said step of collapsing said boundary including the steps of:

examining each pixel contained within said boundary, and moving each examined boundary pixel one pixel location closer to said contained digital objects, said movement being permitted only when:

said examined boundary pixel does not overlap with said contained digital objects;

said examined boundary pixel does not collide with another boundary pixel; and a section of said boundary containing said examined boundary pixel does not violate a predetermined tautness condition; and repeating said step of examining each pixel in said boundary until the location of each pixel in said boundary becomes fixed; and classifying the hull shape attained by said boundary, said classified hull shape being utilized for storage, recognition, classification and retrieval of said digitized document.

6. The method in accordance with claim 5, wherein said step of collapsing said boundary around said contained images includes the steps of:

deleting said examined pixel from said boundary when the two pixels contained within said boundary which neighbor said examined pixel are adjacent to each other.

* * * * *